J. Creager,
Sawing Machine Table.
No. 112,788. Patented Mar. 21, 1871.
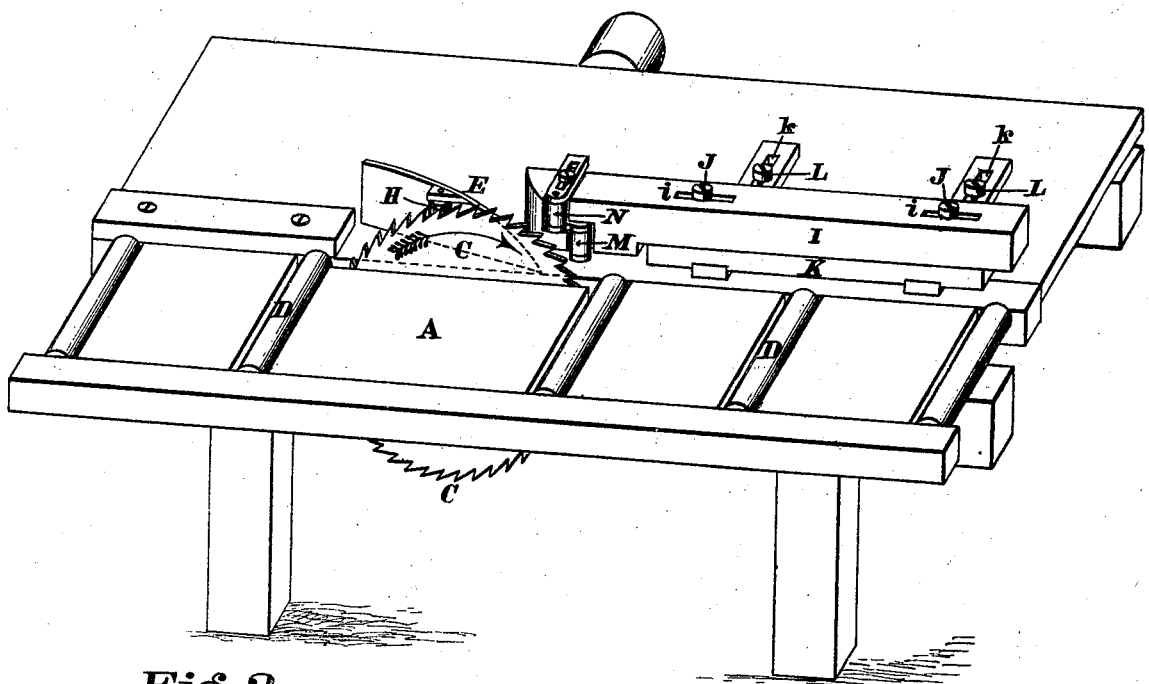
Fig. 2.
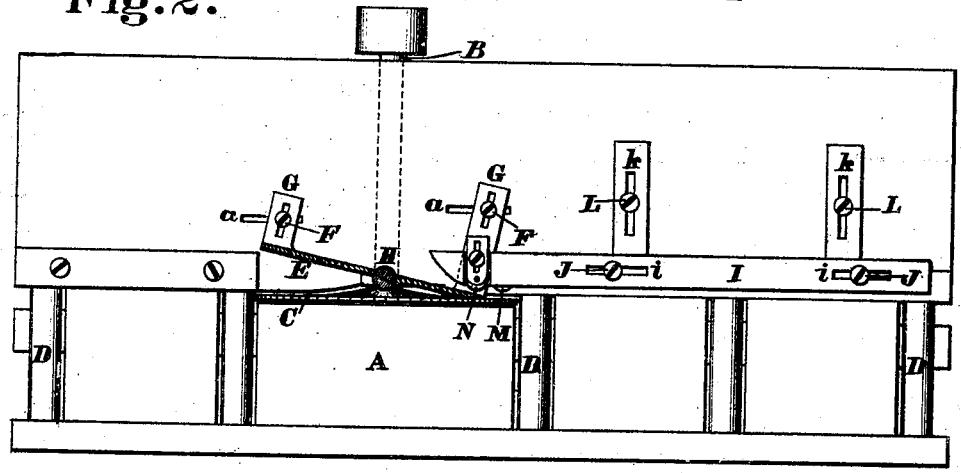
Fig. 3.
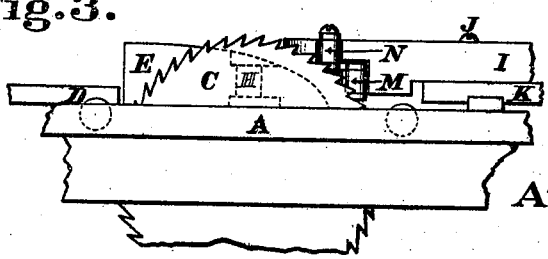
J. Creager
INVENTOR.
By Knight Bros
Attys.
Attest.
Jas. H. Layman
A. T. Brkley

United States Patent Office.

JONATHAN CREAGER, OF CINCINNATI, OHIO.

Letters Patent No. 112,788, dated March 21, 1871.

IMPROVEMENT IN SAWING-MACHINE TABLES.

The Schedule referred to in these Letters Patent and making part of the same.

I, JONATHAN CREAGER, of Cincinnati, Hamilton county, Ohio, have invented a new and useful Sawing-Machine Table for Thin Stuff, of which the following is a specification.

Nature and Objects of the Invention.

This is an improved stuff-supporting and guiding-table for the class of saws employed for cutting veneers and other thin stuff, and comprises an improved arrangement of adjustable gauge and bearing-off rollers, which, in combination with a series of supporting-rollers, serve to secure both greater accuracy and greater rapidity of work.

General Description with Reference to the Drawing.

Figures 1 and 2 are, respectively, a perspective and a top view of a sawing-machine embodying my improvements.

Figure 3 is a front elevation of the saw and its immediate surroundings.

A represents a bench or table, under which is journaled the arbor B of a customary veneer-saw, C—that is to say, a circular saw with very thin cutting-edge, and having a thick central portion or hub.

Parallel with the arbor, and protruding slightly above the top of the bench, is a series of rollers, D, whose office is to support the stuff and to facilitate its advance in the act of cutting.

E is a bearing-off plate, which, rising vertically from the bench, nearly touches the saw-blade on its rear side a little back of its cutting-edge, with which it corresponds in contour, and from which it extends obliquely rearward in the manner represented.

The plate E is attached to the bench by bolts F, which traverse slotted lugs G that project from said plate.

These bolts occupy slots $a$ in the bench parallel with the saw. This double system of slots renders the bearing-off plate adjustable to any desired position or angle.

A roller, H, journaled vertically in the said plate, and protruding slightly beyond the rear or working-face thereof, serves to ease the partially-severed board past the saw while properly opening the kerf for its action.

I is a gauge-strip, attached, by bolts J, to a foot-piece, K, which foot-piece is attached, by bolts L, to the bench.

The said bolts occupying slots $i$ and $k$ in the strip and foot-piece, respectively, enable any desired adjustment of the gauge-piece, either parallel or vertical to the saw's plane.

Journaled vertically in that portion of the gauge-strip nearest the saw, and adjustable in said strip, are two rollers, M N, which are set in such relatively oblique or raking position as to bring the lower edge of the roller immediately in rear of the saw's periphery at that part.

This raking series of rollers M N serves to guide the stuff up to and past the saw, and to hold it uniformly thereto at every part.

While describing the preferred form of my invention, I reserve the right to vary the same so long as I attain the required results by means substantially equivalent; for example, two or more rollers may be used in the bearing-off plate in combination with one or more gauge-rollers.

Where a series of gauge-rollers is employed, their upper ends may, if preferred, rise to a common level, as it is only necessary for their lower ends to follow the curve of the saw.

The gauge-strip and foot may be in one piece, longitudinal adjustment being provided for by slots in the bench.

The piece E may be composed of wood or of metal, or both combined.

For saws of larger diameter the number of my raking gauge-rollers may be increased.

Claim.

The described arrangement of veneer-saw C, supporting-rollers D, obliquely-ascending series of gauge-rollers M N, and the bearing-off roller H, for the purpose set forth.

In testimony of which invention I hereunto set my hand.

JONATHAN CREAGER.

Witnesses:
GEO. H. KNIGHT,
JAMES H. LAYMAN.